United States Patent
Cholewa

(10) Patent No.: US 12,343,646 B2
(45) Date of Patent: Jul. 1, 2025

(54) PROCESS FOR MAKING A PUZZLE AND THE PUZZLE MADE THEREBY

(71) Applicant: Starz Puzzles LLC, Elmhurst, IL (US)

(72) Inventor: Thomas M. Cholewa, Elmhurst, IL (US)

(73) Assignee: STARZ PUZZLES LLC, Elmhurst, IL (US)

( * ) Notice: Subject to any disclaimer, the term of this patent is extended or adjusted under 35 U.S.C. 154(b) by 670 days.

(21) Appl. No.: 17/347,758

(22) Filed: Jun. 15, 2021

(65) Prior Publication Data
US 2021/0387083 A1    Dec. 16, 2021

Related U.S. Application Data

(60) Provisional application No. 63/038,925, filed on Jun. 15, 2020.

(51) Int. Cl.
| | |
|---|---|
| *A63F 9/10* | (2006.01) |
| *A63F 9/06* | (2006.01) |
| *B41M 3/00* | (2006.01) |
| *B65D 85/00* | (2006.01) |

(52) U.S. Cl.
CPC ............... *A63F 9/10* (2013.01); *B41M 3/00* (2013.01); *B65D 85/54* (2013.01); *A63F 9/0669* (2013.01); *A63F 2009/1072* (2013.01); *A63F 2009/1083* (2013.01)

(58) Field of Classification Search
CPC .. A63F 9/10; A63F 9/0669; A63F 2009/1072; A63F 2009/1083; B41M 3/00; B65D 85/54; B23K 2101/18; B23K 2103/36; B23K 2103/42; B23K 26/402; B23K 26/38
See application file for complete search history.

(56) References Cited

U.S. PATENT DOCUMENTS

| | | | |
|---|---|---|---|
| 8,490,976 B2 * | 7/2013 | Salgado | A63F 3/00 273/153 R |
| 2003/0160987 A1 * | 8/2003 | Zumbo | D06P 5/30 358/1.9 |

OTHER PUBLICATIONS

Thinklaser Limited, "How To Laser Cut a Jigsaw Puzzle (2019)" Posted Jan. 9, 2019. Available at <https://www.youtube.com/watch?v=xqhOrY8unn4> (Year: 2019).*
WoodCritique, "10 Best Exterior Wood Primers—Reviews & Buyer's Guide" Posted Mar. 26, 2020. Available at <https://woodcritique.com/primers/best-exterior-wood-primers/> (Year: 2020).*
WayPrinter—Custom Jigsaw puzzle uv printer print on picture puzzle by A4 uv flatbed printer YouTube Video; dated Jul. 22, 2019. Accessed at <https://www.youtube.com/watch?v=Gc3yzq7NaTg> (Year: 2019).*

* cited by examiner

*Primary Examiner* — Alex B Efta
*Assistant Examiner* — Alexander S Wright
(74) *Attorney, Agent, or Firm* — Flener IP & Business Law; Zareefa B. Flener

(57) ABSTRACT

A process for making a puzzle includes the step of cutting puzzle pieces from a sheet of material and subsequently printing an image on the cut pieces. The resulting puzzle is far more durable than a conventional jigsaw puzzle and because of the process used to make it also benefits from the ability to replace individual pieces if lost. The puzzle is packaged intact in a packaging sleeve assembly designed to durably and aesthetically package the puzzle.

13 Claims, 12 Drawing Sheets

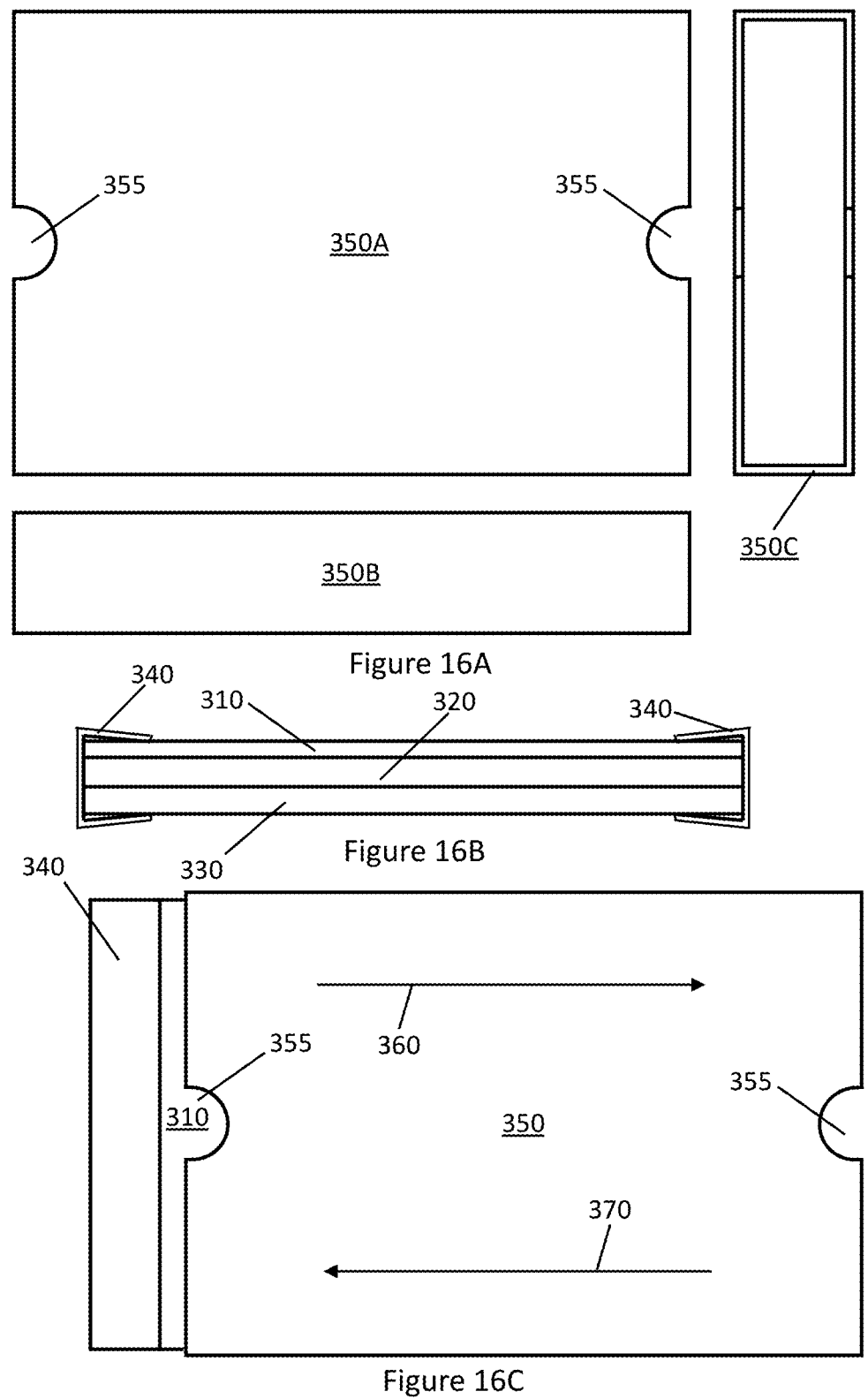

PROCESS FOR MAKING A PUZZLE AND THE PUZZLE MADE THEREBY

CROSS-REFERENCE TO RELATED APPLICATIONS

This application claims priority to U.S. Provisional Application Ser. No. 63/038,925 filed on Jun. 15, 2020, the disclosure of which is hereby incorporated herein by reference in its entirety.

FIELD OF THE DISCLOSURE

The present disclosure relates to a process for making a puzzle, the puzzle made thereby, and the packaging sleeve therefor. More specifically, the present invention relates to a process for making a puzzle from wood without paper or other coating material, wherein the puzzle pieces are cut before being printed, a puzzle made thereby, and the packaging sleeve therefor.

BACKGROUND

Jigsaw puzzles have been known for centuries. The earliest known jigsaw puzzles are believed to have been made in about the 1760s by pasting maps onto a backing material and subsequently cutting the pasted maps and backing into puzzle pieces. Methods for printing and cutting have improved considerably since then; however, the traditional process for making jigsaw puzzles has not substantially changed. Modern puzzles are still made by printing an image onto paper or a paper derived layer of material that is subsequently affixed to a stiffening backing material and then cut into pieces. The cut-up puzzle is then commonly wiped with a cleaning solution or other chemical treatment to remove bits of material remaining from the cutting step.

The traditional method for making jigsaw puzzles suffers from several drawbacks. First, the paper or paper derived material layer is inherently absorbent, which lowers the durability of the puzzle by making it susceptible to damage from spilled liquids that can soak into the puzzle. Liquids so absorbed can damage the integrity of the paper or paper derived material layer or cause the images printed thereon to be smeared, altered, or otherwise damaged or destroyed. Second, the paper or paper derived material layer may further be inherently soft making it susceptible to damage from being gouged or scratched, which again may cause the images printed thereon to be damaged or destroyed.

Jigsaw puzzles manufactured without the paper or paper derived material layer are known. For example, Salgado, U.S. Pat. No. 8,490,976 discloses a double-sided transparent plastic tessellated jigsaw puzzle. Salgado discloses two acrylic sheets that are each printed with an image and then bonded together on their printed faces. The bonded sheets are then laser cut into tessellations of an identical shape surrounded by a border. While Salgado does eliminate the paper or paper derived material layer upon which an image is printed, cutting of the acrylic sheets already having the image printed thereon can cause undesirable damage to the image. Further, each of the acrylic sheets is disclosed to have a protective paper layer on both sides that must be removed as an additional step.

Therefore, a need exists for a process for making a jigsaw puzzle with only cutting and printing steps from a puzzle making material without a paper or paper derived material layer. Being able to cut the puzzle making material before printing an image onto one or both sides of it would be beneficial because printing the image after cutting the puzzle making material results in a more coherent assembled puzzle image that doesn't have gaps between the portions of the image on individual puzzle pieces, eliminates the need to clean up the image of cutting residue by wiping or cleaning it, and also eliminates any risk of further damaging the image by the cutting process.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope.

FIG. 16A illustrates three views of an exemplary outer sleeve of the packaging sleeve assembly;

FIG. 16B is a front view of two clamping strips applied to opposite edges of the assembled top, middle, and bottom panels; and FIG. 16C illustrates the outer sleeve sliding over the assembled top, middle, and bottom panels to complete assembly of the packaging sleeve assembly.

Figure 1:
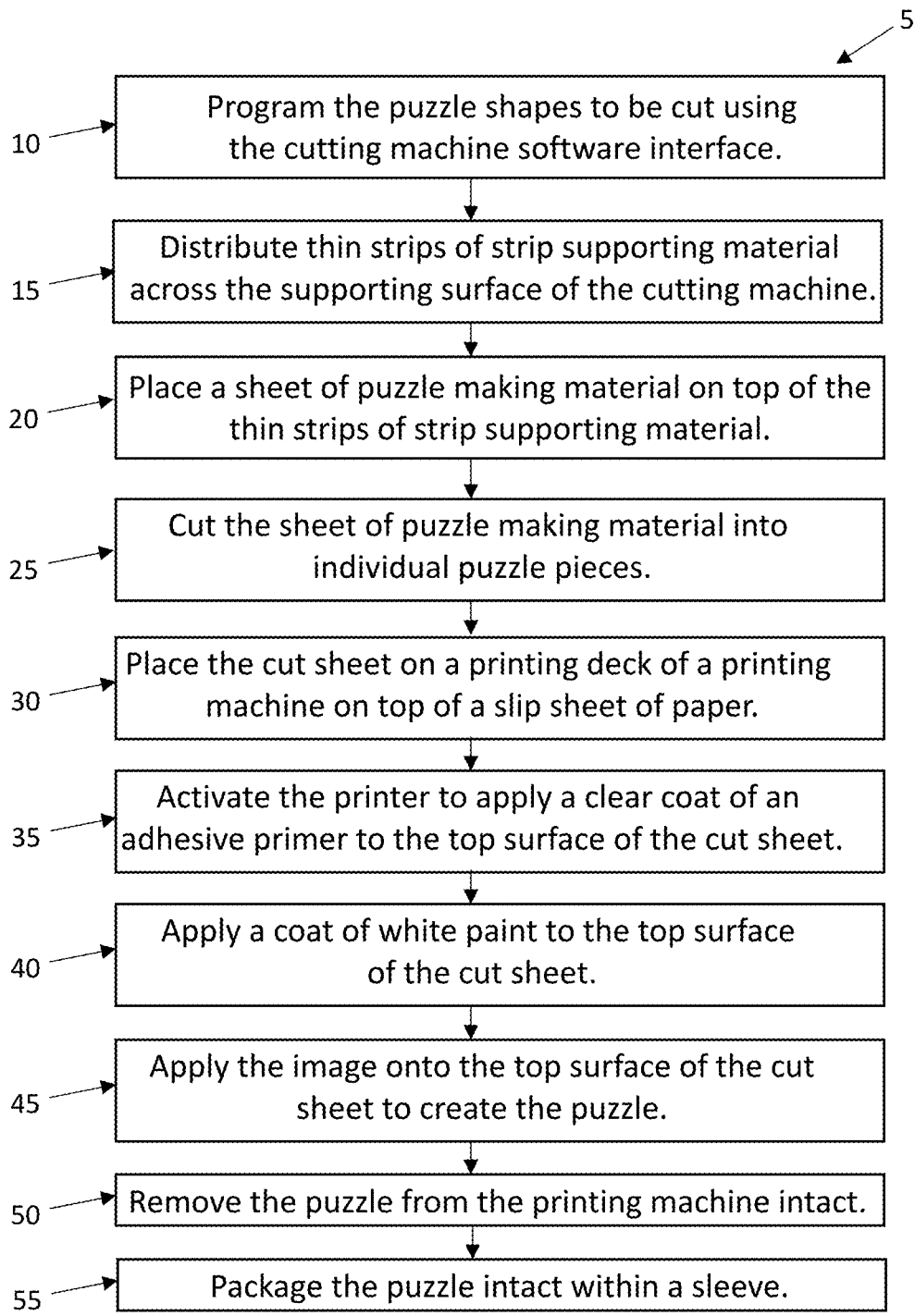
FIG. 1 is a process flowchart for an embodiment of a process for making a puzzle.

In the following detailed description, various embodiments are described with reference to the appended drawings. The skilled person will understand that the accompanying drawings are schematic and simplified for clarity. Like reference numerals refer to like elements or components throughout. Like elements or components will therefore not necessarily be described in detail with respect to each figure.

DETAILED DESCRIPTION

Suitable raw materials for making puzzles using the process described herein include rigid materials such as plastics and wood, for example without limitation, maple, and other types of wood or other suitable materials as are known in the art. In one embodiment the process utilizes a sheet of such suitable puzzle making material. For example, the sheet of puzzle making material is a sheet of wood or another material in a range of thicknesses between about 0.1 inch and about 0.5 inch thick. In another embodiment, the sheet of puzzle making material is a sheet of wood or another material in a range of thicknesses between about 0.2 inch and about 0.3 inch thick. In a further embodiment the sheet of puzzle making material is a sheet of wood or another material about 0.25 inch thick. In other embodiments, the lateral dimensions of the sheet of puzzle making material may be large enough to produce one puzzle or several puzzles.

The puzzle making material is cut into individual pieces by a specialized cutting machine. The cutting machine used in the process for making a puzzle can be any suitable cutting machine capable of precision cutting of intricate shapes. Such cutting machines typically have a software driven control interface that allows a user to program the precise shapes to be cut in the puzzle making material that is placed flat onto a cutting table in or on the cutting machine. In one embodiment such a cutting machine may be for example without limitation a 60 Watt Helix Laser Machine made by Epilog Laser, 16371 Table Mountain Parkway, Golden, Colorado 80403.

Referring to a process flowchart illustrated in FIG. 1, a first embodiment of a process for making a puzzle 5 starts at step 10 with programming a particular set of one or more puzzle shapes to be cut into a cutting machine. Once the puzzle making material is placed onto the cutting table and the operator initiates the cutting process, a laser is guided as programmed into the software to follow the precise shapes to be cut in the puzzle making material. Because the laser will typically cut entirely through the sheet of puzzle making material, a supporting surface 100 is disposed under the sheet of puzzle making material on top of the cutting table.

The supporting surface 100 has a surface geometry and/or is made from a material that can withstand the energy of the cutting laser that penetrates through the puzzle making material. Preferably, the supporting surface 100 absorbs or dissipates the energy internally without reflecting the energy back at or conducting the energy back into the bottom side of the puzzle making material, because such back reflected/conducted energy can cause unwanted damage to the puzzle making material including surface abrasions and chips on the edges of the pieces being cut. As described further below, in an embodiment, the supporting surface 100 has a structure including any arrangement of walls disposed between openings that are directed toward the top surface of the supporting surface 100, wherein most of the radiant energy incident on the top surface from the cutting laser passes into the openings, and only a small fraction of the energy is back reflected by the top edges of the walls. Likewise, the walls separating the openings also provide only a minimal path for thermal energy to conduct back up toward the top surface of the supporting surface 100. In one embodiment, for example, the cutting machine is the 60 Watt Helix Laser Machine as described hereinabove and the supporting surface 100 is made of a metallic honeycomb material oriented with hexagonal holes facing upwardly as illustrated schematically in FIG. 2.

Figure 2:
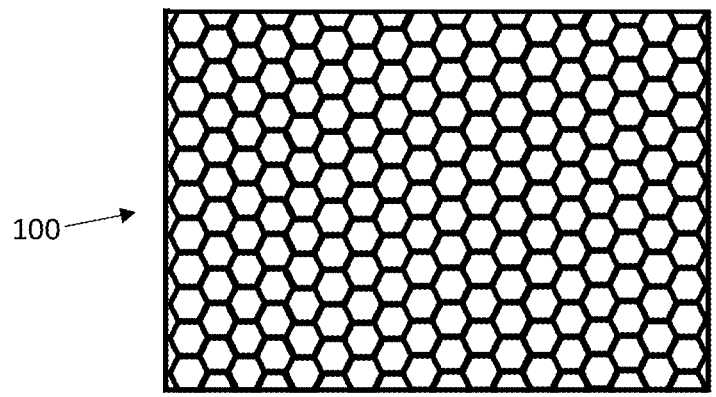
FIG. 2 is a schematic top view of an exemplary supporting surface for a cutting machine.

It is to be noted that the honeycomb patterned supporting surface 100 illustrated in FIG. 2 is not provided as indicative of a required pattern shape, as having a representative overall size, or as having a representative size for the individual pattern shapes, but is instead simply a schematic representation of an exemplary supporting surface 100. As noted above, other pattern shapes for the openings are also possible including for example without limitation triangles, squares, pentagons, or any closed regular or irregular polygons or combinations thereof. In one embodiment the supporting surface 100 is made from metal, but in other embodiments the supporting surface 100 can be made from any material suitable for absorbing and/or dissipating laser energy as may be known in the art.

The problem of back reflected radiant energy or back conducted thermal energy damaging the bottom side of the puzzle making material is solved at least in part, in an embodiment, by the selective placement of a plurality of thin strips 120 of a strip supporting material between the puzzle making material and the supporting surface 100. The plurality of thin strips 120 can be made of any material suitable for supporting a sheet of puzzle making material on the supporting surface 100 without itself back reflecting radiant energy or back conducting thermal energy to the back of the puzzle making material, for example without limitation, wood or other suitable materials as are known in the art.

Without being held to any particular theory, it is believed that placing the puzzle making material on top of the plurality of thin strips 120 of strip supporting material provides a sufficient spacing between the bottom side of the puzzle making material and the supporting surface 100 so that any back-reflected or back-conducted energy from the supporting surface 100 dissipates sufficiently so as to cause no damage to the bottom side of the puzzle making material.

It is of interest that as the cutting machine is used over time to cut through various puzzle making materials that the patterned material of the supporting surface 100 tends to get darkened by the energy of the cutting laser and/or darkened by a coating of soot resulting from the various puzzle making materials being burnt through by the laser. It has been found that a qualitative relationship exists between the optimal height of the plurality of thin strips 120 of strip supporting material and the level of darkening of the material of the supporting surface 100. The plurality of thin strips 120 can be relatively thinner and still work well if the supporting surface 100 material is significantly darkened, whereas the plurality of thin strips 120 are more preferably thicker if the supporting surface 100 material is not significantly darkened. Another consideration for the cross-sectional thickness of the plurality of thin strips 120 is the amount of soot that transfers by contact from the plurality of thin strips 120 to the bottom side of the puzzle making material when the cutting laser slices through the plurality of thin strips 120.

Referring again to FIG. 1, at step 15 in one embodiment the plurality of thin strips 120 of strip supporting material are distributed across the honeycomb material of the supporting surface 100 of the cutting machine. For example as shown in FIG. 3, the plurality of thin strips 120 are distributed across the supporting surface 100 and spaced apart no more than the width of any of the individual puzzle pieces to be cut to ensure that no individual puzzle piece slips down onto the supporting surface 100 once it has been entirely cut out from the sheet of puzzle making material.

Figure 4:
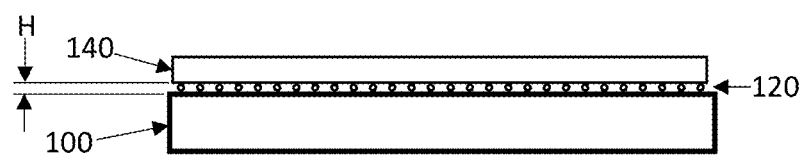
FIG. 4 is a schematic side view of a sheet of puzzle making material disposed on top of a plurality of thin strips in turn disposed on an exemplary supporting surface for a cutting machine.

Referring to FIG. 1, in one embodiment at step 20 the sheet of puzzle making material is subsequently placed on top of the distributed plurality of thin strips 120 of strip supporting material. FIG. 4 illustrates a side view of a sheet of puzzle making material 140 disposed on top of the plurality of thin strips 120 that are, in turn, disposed on top of the supporting surface 100. In the side view of FIG. 4, the plurality of thin strips 120 are illustrated to have circular cross-sections; however, the particular cross-sectional shape of the plurality of thin strips 120 can be approximately round, or elliptical, or oval, or rectangular or any convenient shape that thin strips of strip supporting material are available or may be cut as may be known in the art.

Figure 3:
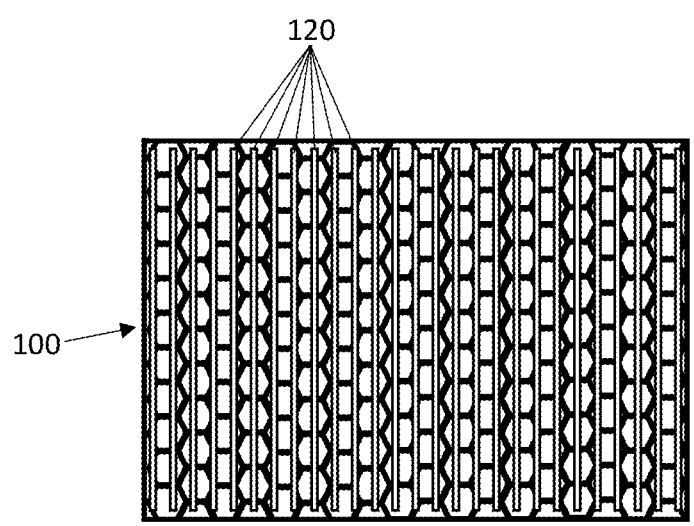
FIG. 3 is a schematic top view of a plurality of thin strips distributed across an exemplary supporting for a cutting machine.

Each of the plurality of thin strips 120 is long enough to essentially span a sheet of puzzle making material as illustrated in FIG. 3, and can have any cross-sectional shape as is convenient or available. Including all of the above considerations, in one embodiment each of the plurality of thin strips 120 may have any cross-sectional dimension between about 0.01 inch and about 0.25 inch thick so that when arranged on the supporting surface 100 as illustrated in FIG. 4, the height dimension of the plurality of thin strips 120, labeled as H in FIG. 4, defined herein to be the supporting thickness, is in a range between about 0.01 inch and about 0.25 inch. In another embodiment when arranged on the supporting surface 100 as illustrated in FIG. 4, the height dimension of the plurality of thin strips 120, labeled as H in FIG. 4, is in a range between about 0.03 inch and about 0.13 inch. In a further embodiment when arranged on the supporting surface 100 as illustrated in FIG. 4, the height dimension of the plurality of thin strips 120, labeled as H in FIG. 4, is about 0.06 inch.

Figure 5:
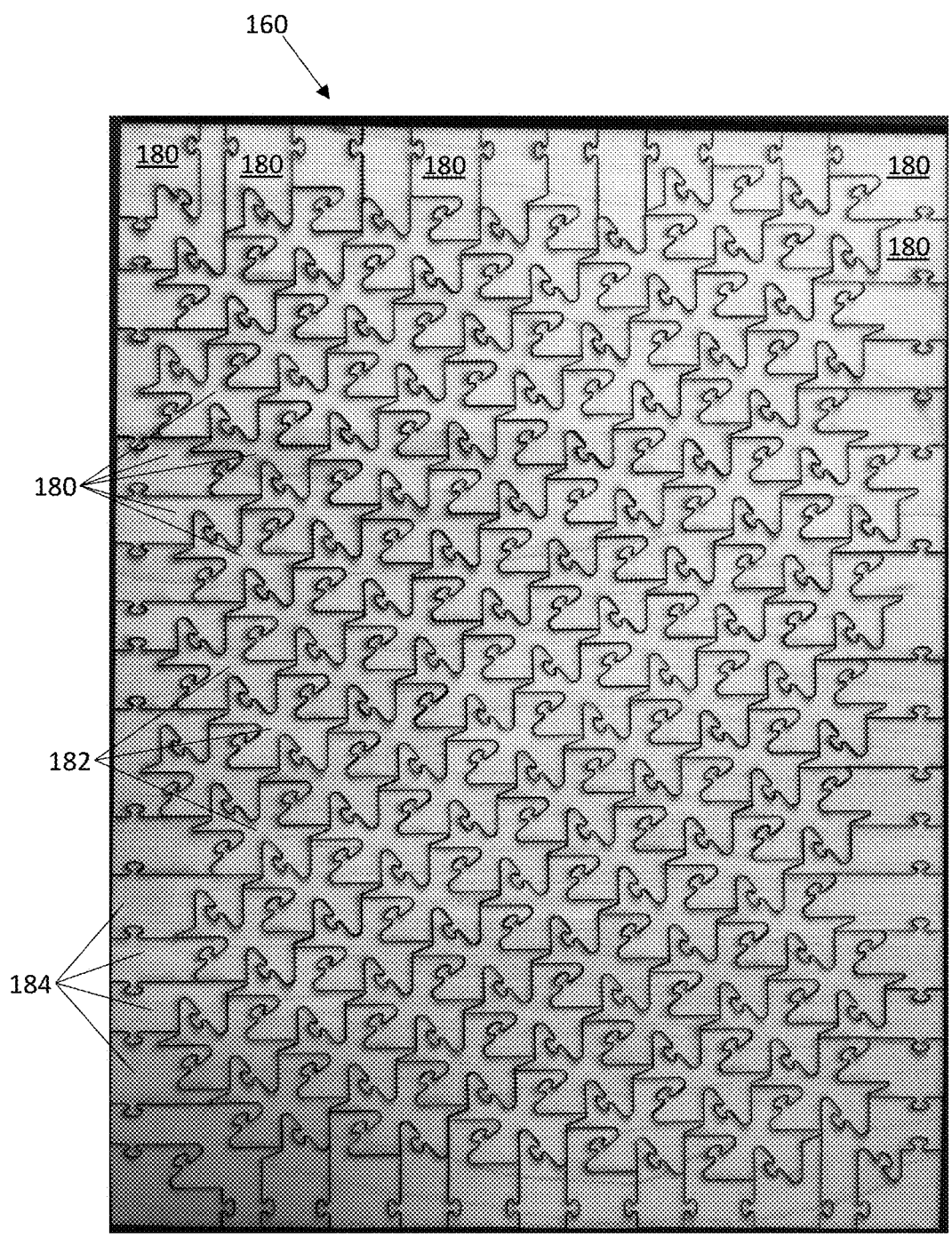
FIG. 5 is a top view of an exemplary cut sheet of puzzle making material illustrated after having been cut into exemplary individual puzzle pieces.

Once the sheet of puzzle making material 140 is positioned on top of the plurality of thin strips 120 of strip supporting material, in one embodiment the cutting machine is activated at step 25 of FIG. 1 to cut out individual puzzle pieces from the sheet of puzzle making material 140. Referring to FIG. 5, a cut sheet 160 of puzzle making material is illustrated after having been cut into exemplary individual puzzle pieces 180. In one embodiment at this stage in the process for making a puzzle 5 the cut sheet 160 of puzzle making material is removed intact from the cutting machine, for example, by lifting the entire supporting surface 100 out of the cutting machine. A top and/or bottom surface of the cut sheet 160, depending on whether a puzzle will be printed onto one or both sides of the cut sheet 160, may be optionally sanded to assure optimal smoothness of the top and/or bottom surfaces of the one or more cut sheets 160.

Referring again to FIG. 1, at step 30, in one embodiment the cut sheet 160 is placed on a printing deck of a printing machine on top of a slip sheet of paper. The printing machine can be any sort of machine suitable for printing images onto one or more substrates placed onto the printing deck of the printing machine. In one embodiment, the substrate to be printed on includes one side of one or more of the cut sheets 160 of puzzle making material, which are in turn disposed on one or more slip sheets of paper on the printing deck. In another embodiment, as described hereinbelow, the substrate to be printed on includes both sides of one or more of the cut sheets 160 of puzzle making material, which are in turn disposed on one or more slip sheets of paper on the printing deck. In one embodiment the printing machine may be for example without limitation a Tabletop Type LED-UV Curing Flatbed Inkjet Printer model UJF-6042 MkII made by Mimaki Global, 2182-3 Shigeno-Otsu, Tomi-city, Nagano, Japan. The printing machine includes an interface that allows a user to upload or program an image into the printing machine for printing onto the one or more substrates. The image to be printed could be added into the printing machine at the time of printing or be stored in the printing machine from being previously added.

Upon placement of the one or more cut sheets 160 onto the printing deck of the printing machine, after checking to be sure that all portions of the one or more cut sheets 160 are lying flat on the printing deck, a user activates the printing machine to begin the printing process. Referring to FIG. 1, at step 35, in one embodiment the printing machine applies a clear coat of an adhesive primer to the upwardly facing surface of the one or more cut sheets 160. Typical of such printing machines, the material applied is sprayed from one or more print heads that move on a carriage over the surface of the substrate, in this embodiment the one or more cut sheets 160. The printing machine may further include an optional feature for curing the material being sprayed, though this is not required. For example, the exemplary UJF-6042 MkII described hereinabove includes one or more UV LEDs also mounted on a carriage that tracks with the one or more print heads and cures the material sprayed onto the substrate. When printed in a printing machine having such a curing feature, the printed product is dry to the touch upon completion of the printing process.

Following the clear coat of adhesive primer, at step 40 of FIG. 1, in one embodiment the printer applies a coat of white paint to the upwardly facing surface of the one or more cut sheets 160. The white paint provides a consistent and uniform base background onto which additional colors of the image may be applied to produce vibrant and color true images. After application of the coat of white paint to the one or more cut sheets 160, optionally the one or more cut sheets 160 may be checked for flatness to be sure that no portion or no pieces of the one or more cut sheets 160 have risen to become uneven with other portions of the one or more cut sheets 160. The upwardly facing surface of the one or more cut sheets 160 may also be optionally very lightly sanded to assure optimal smoothness of the top surface of the one or more cut sheets 160.

Referring again to FIG. 1, in one embodiment at step 45 one or more images for one or more puzzles are printed onto the upwardly facing surfaces of the one or more cut sheets 160. When the images are printed using a machine having a curing feature as described above, the printing and curing happen simultaneously so when the one or more print heads make the final pass over the one or more cut sheets 160 the one or more puzzles have been printed and cured.

In one embodiment, after the printing and optional curing steps on an upwardly facing first surface, the one or more cut sheets 160, which now have images printed (and optionally cured) onto the first surface thereof can be flipped over so that a second surface opposite the first surface is facing upwardly. As noted hereinabove, the second surface may be optionally sanded to assure optimal smoothness of the upwardly facing surface of the one or more cut sheets 160. The steps 30, 35, 40, and 45 and optional sanding and curing steps described hereinabove can be repeated for the second surface to print and optionally cure an image onto the second surface. The image printed onto the second surface can be the same or different than the image printed onto the first surface. In this embodiment such a puzzle having images printed on both first and second surfaces may comprise two different puzzles where each surface comprises a different puzzle. At step 50 of FIG. 1, after completion of the printing process the one or more puzzles are now removed from the printing machine intact in preparation for packaging.

Figure 6:
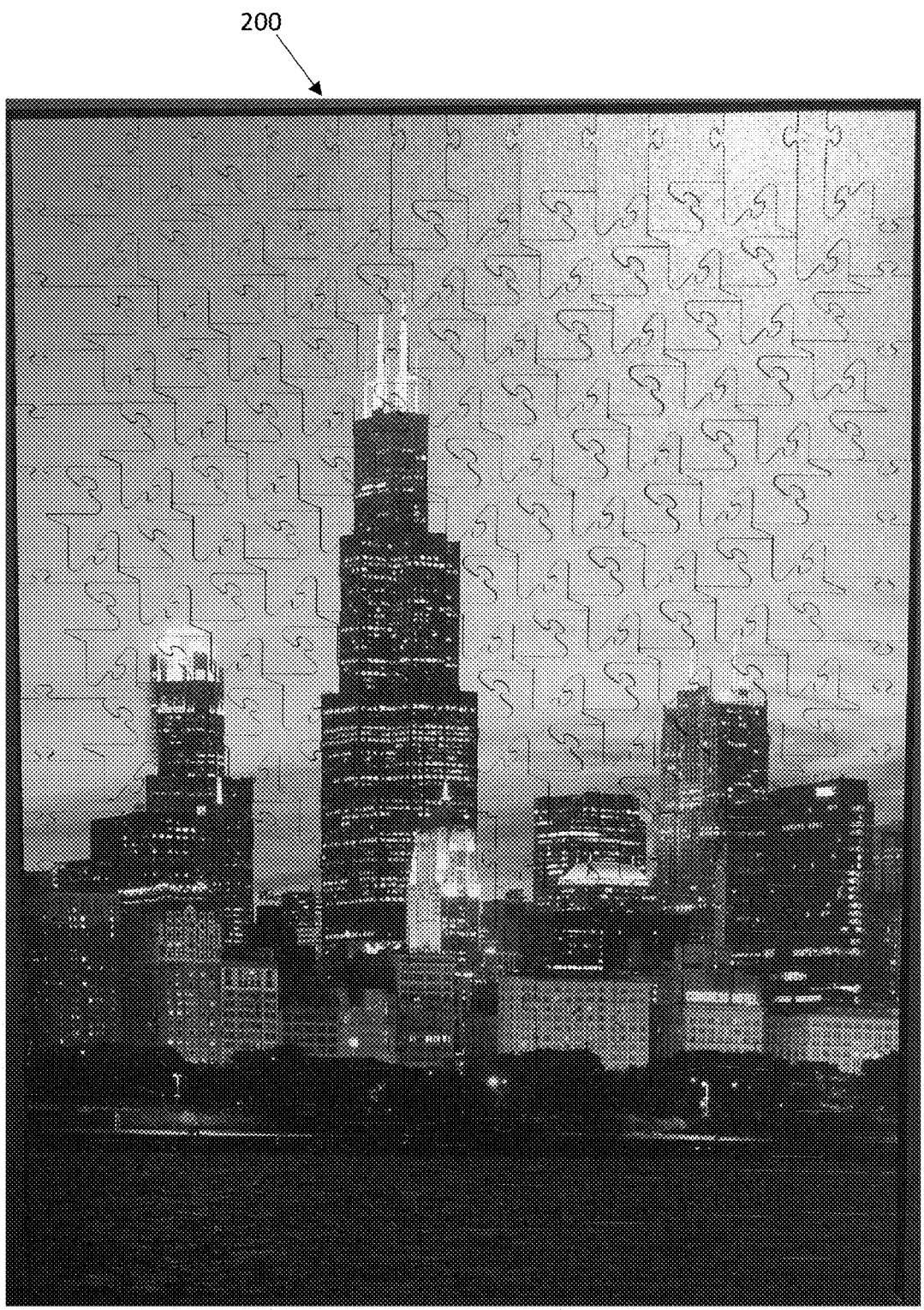
FIG. 6 is an exemplary puzzle made using the process disclosed herein.

Referring to FIG. 6, an exemplary puzzle 200 is illustrated that was made using the exemplary process for making a puzzle 5 disclosed herein. At step 55 of FIG. 1, in one embodiment the intact completed puzzle 200 is packaged intact within a packaging sleeve assembly, which is described in further detail hereinbelow.

Referring back to FIG. 5, in the embodiment of the cut sheet 160 that is shown the individual puzzle pieces 180 are clearly visible. It is of note that in this embodiment all of the internal individual pieces 182 are of the same shape, while the boundary pieces 184 around the perimeter of the cut sheet 160 are of various shapes that are cut to have a flat exterior edge while matching up with the other boundary pieces 184 and the internal individual pieces 182. The above disclosed process for making a puzzle does not depend upon the shape of the individual pieces 180 that are cut from the cut sheet 160 and may be applied to puzzles having individual pieces of any one or multiple different shapes.

The internal individual pieces 182 are repeating identical pieces that are commonly known as a tessellation. Tessellations are known in the art and are described in Salgado, U.S. Pat. No. 8,490,976, which is cited hereinabove. Often, as disclosed by Salgado and elsewhere, the tiles forming the tessellation are symmetrical or can be rotated around to be made to fit together to form a repeating pattern. In the instant application the internal individual pieces 182 are not symmetrical across any line drawn through them, nor are they rotationally symmetrical. Despite this total lack of symmetry, the internal individual pieces 182 fit together all oriented in the same orientation without any relative rotation.

The hereinabove disclosed process for making a puzzle 5 has multiple advantages over traditional methods for making a puzzle. The process 5 allows for the use of a hardwood, for example, maple, that is excellent in terms of strength and durability. The ability to cut the individual pieces 180 on a laser cutting machine before subsequently printing the puzzle image onto the individual pieces 180 allows for enhanced image quality without any gaps or spaces in the puzzle image. This is because cutting the puzzle making material 140 after the puzzle image has been printed on it will always create gaps or spaces in the puzzle image corresponding to the portion of the puzzle image that gets cut through. These gaps or spaces may be made smaller by using a finer cutting implement that cuts less material away but there will always be gaps or spaces produced in the image if the image is cut through. The process 5 also produces individual pieces that fit tightly together without any cutting dust or debris that could otherwise damage the puzzle image.

Another benefit of the instant process is that losing one or more pieces of a puzzle isn't a problem. Because the process prints images directly onto the puzzle making material 140, for example maple, without any paper or paper derived material layers on the maple, and because in one embodiment all of the internal individual pieces 182 are the same tessellation, any lost piece can be replaced, and the same puzzle image as the original or an entirely different puzzle image can be printed onto the assembled cut sheet 160 of all of the individual pieces 180.

While tessellated puzzles are known in the art, the inclusion of a tessellation within a puzzle allows for some additional features not otherwise possible in puzzles not having a tessellation. In one embodiment for example, two or more individual borderless tessellated puzzles can be combined to create a larger borderless tessellated puzzle. Where, for example, each of the individual borderless tessellated puzzles is descriptive of or representative of a portion of a larger whole, a combination of the individual borderless tessellated puzzles can be constructed as representative of the whole, or a larger portion thereof.

Figure 7:
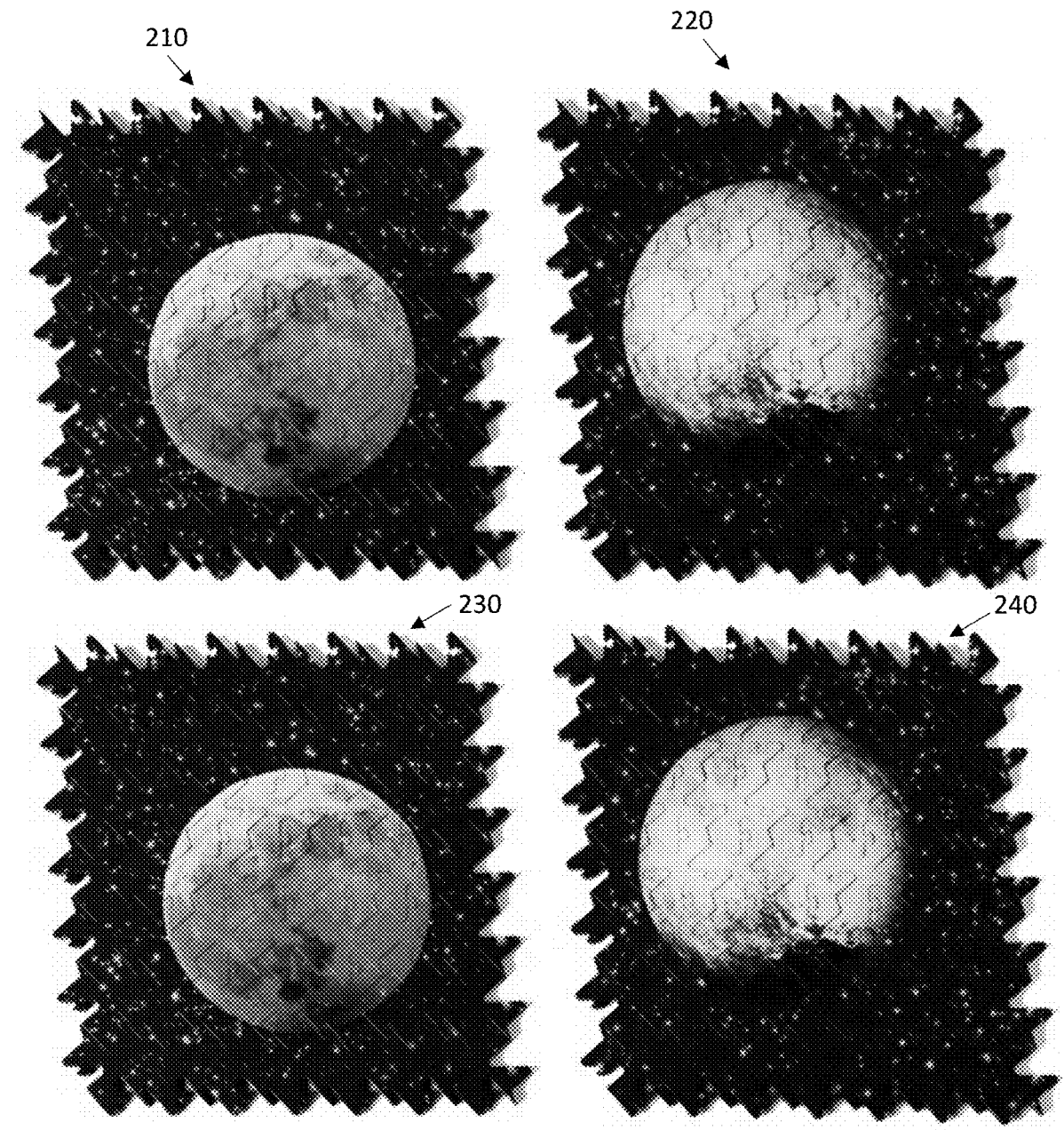
FIG. 7 illustrates two or more individual borderless tessellated puzzles can be combined to create a larger borderless tessellated puzzle.

For example in one embodiment a first borderless tessellated puzzle 210 is of an image of a first character of a group of related characters from for example, a book or a story. Referring to FIG. 7, in another embodiment a first borderless tessellated puzzle 210 is of an image of a first planet of a group of planets for example without limitation, the planets of our solar system. The first borderless tessellated puzzle 210 is made from only internal individual pieces 182 (the tessellations) entirely lacking a border made from boundary pieces 184. In this embodiment, a second borderless tessellated puzzle 220 is of an image of a second planet from the group of planets. FIG. 7 illustrates 4 individual borderless tessellated puzzles 210, 220, 230, and 240 each showing an individual planet, where the individual borderless tessellated puzzles 210, 220, 230, and 240 can be combined together along their perimeters to create a larger borderless tessellated puzzle. Although FIG. 7 illustrates 4 individual borderless tessellated puzzles, any number of individual borderless tessellated puzzles, for example 5, 6, 7, 8, 9, 10 or more, or combinations of individual borderless tessellated puzzles, can be combined in this way to produce a combination of the individual borderless tessellated puzzles, or a combination of combinations of individual borderless tessellated puzzles, or both, that is descriptive or representative of the whole of the group of puzzles, for example, planets, or a larger portion thereof. For example, one combination of 4 individual borderless tessellated puzzles could be combined with other combinations of 4 (or any number) of individual borderless tessellated puzzles to construct the whole or a still larger portion of the whole, for example, of the group of planets.

Figure 8:
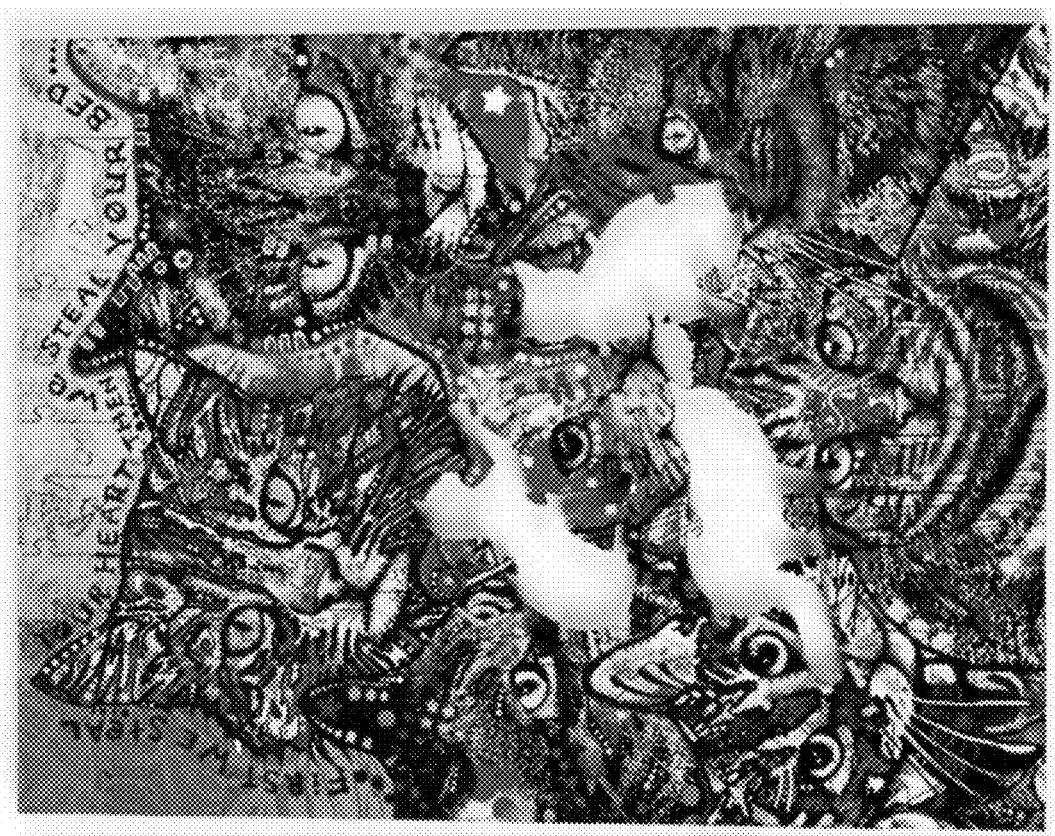
FIG. 8 illustrates a first exemplary embodiment of a puzzle having individual pieces in the shape of an image depicted by the puzzle.
Figure 8:
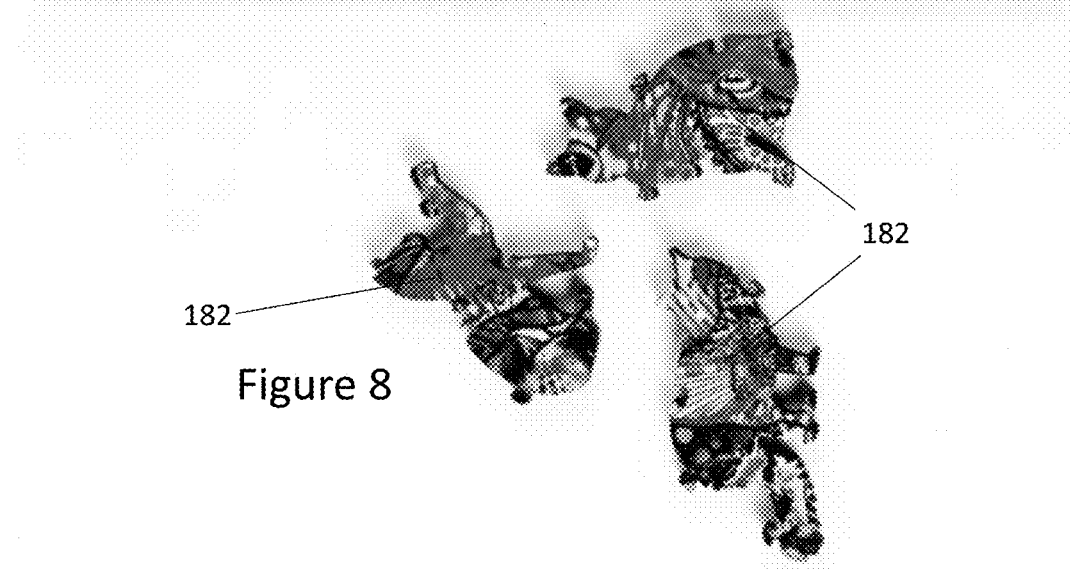
Figure 9:
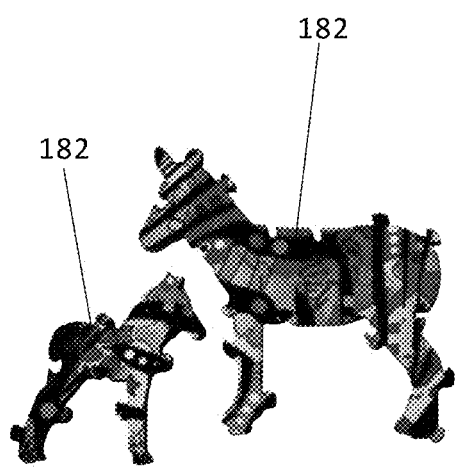
FIG. 9 illustrates a second exemplary embodiment of a puzzle having individual pieces in the shape of an image depicted by the puzzle.
Figure 9:
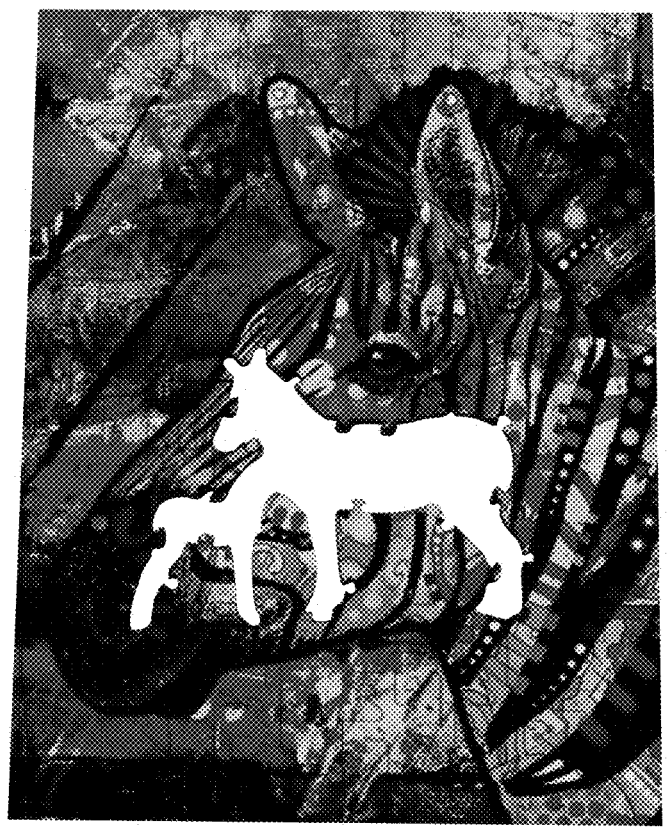
Figure 10:
FIG. 10 illustrates a third exemplary embodiment of a puzzle having individual pieces in the shape of an image depicted by the puzzle, wherein the puzzle itself is further formed into the shape of the image.

In another embodiment, one or more of the internal individual pieces 182 of a puzzle produced by the process 5 can be made into customized shapes that can be shaped like an image depicted by the puzzle. For example referring to FIG. 8, in one exemplary embodiment without limitation, for a puzzle image comprising cats, some of the internal individual pieces 182 can be cut into the shape of cats. Referring to FIG. 9, in another exemplary embodiment without limitation, for a puzzle image comprising horses, some of the internal individual pieces 182 can be cut into the shape of horses. In yet a further exemplary embodiment, referring to FIG. 10, not only can one or more of the internal individual pieces 182 be cut into the shape of an image of the puzzle, the puzzle itself can be formed into the shape of the image as well, in this example, a Cannabis leaf.

The technique of cutting the pieces into one or more similar or entirely different customized shapes that may or may not be relevant to the puzzle image can be extended to any shape, group of similar shapes, or group of entirely different shapes as desired without limitation, and may further be practiced with a tessellated internal individual piece 182 or without a tessellated internal individual piece 182. In other examples without limitation the internal individual pieces 182 can be cut into the shape of dogs, trees, birds, stars, other animals, other objects, characters, or into the shape of any image as desired, with or without tessellated internal individual pieces 182.

Figure 11:
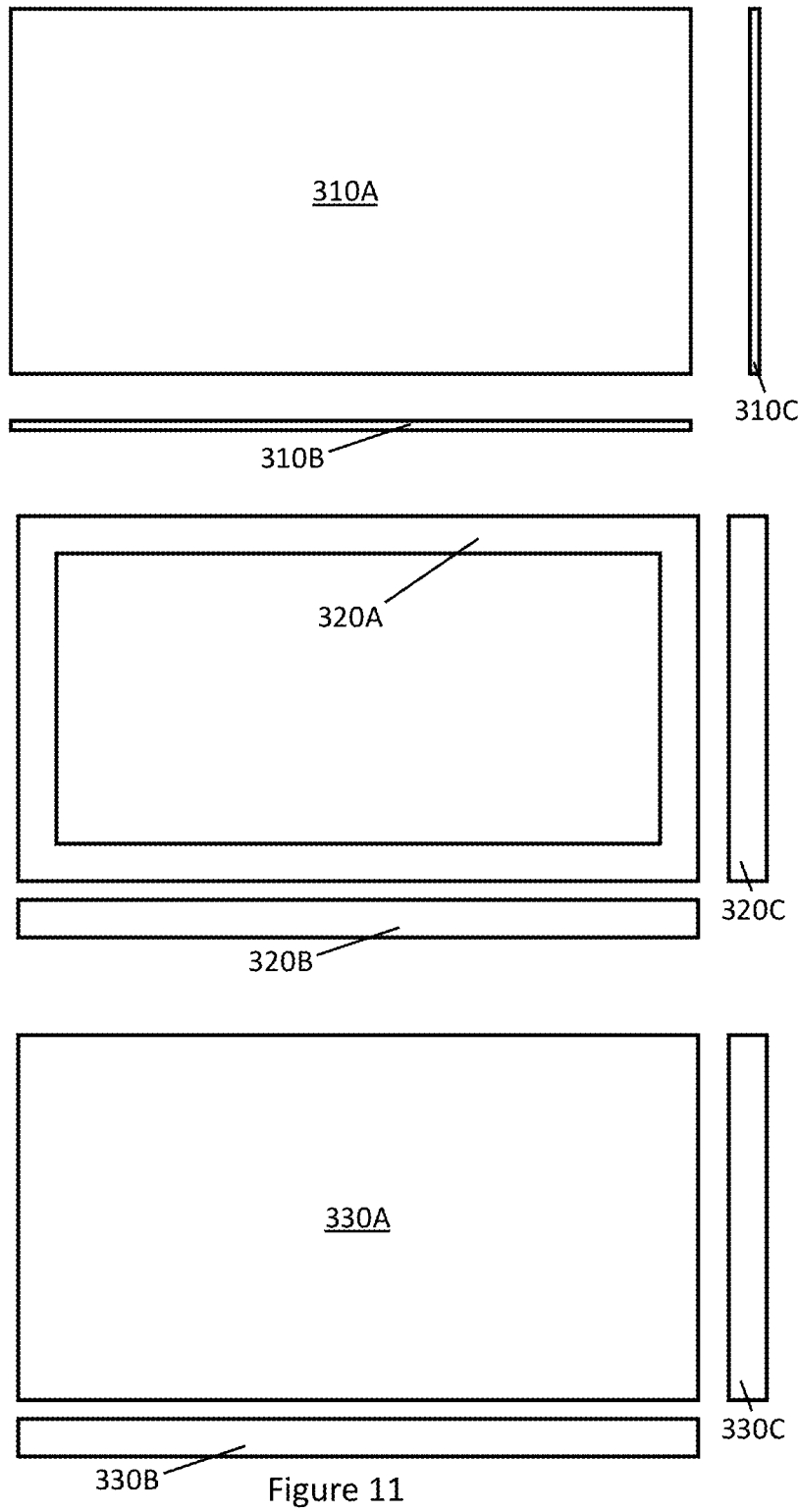
FIG. 11 illustrates schematic views of an exemplary embodiment of top, middle, and bottom panels of a packaging sleeve assembly.

As indicated hereinabove, at step 55 of FIG. 1, in one embodiment the assembled or intact completed puzzle 200 is packaged intact within a packaging sleeve assembly. Referring to FIG. 11 an embodiment of a packaging sleeve assembly 300 comprises exemplary embodiments of a top panel 310, a middle panel 320, and a bottom panel 330. Each of the top, middle, and bottom panels 310, 320, 330 is shown in a top view (310A, 320A, 330A), a front view (310B, 320B, 330B) and a left side view (310C, 320C, 330C).

The material used for the three panels 310, 320, 330 may be any material known in the art having sufficient rigidness to keep its shape, for example without limitation, cardboard, foam board, wood, or other materials suitable for the purpose as may be known in the art. With the exception of the thickness of the middle panel 320, the thicknesses and lateral dimensions of the top, middle, and bottom panels 310, 320, 330 illustrated in FIG. 11 can be any relative or absolute thickness as desired or suitable and may depend upon the material used with the one constraint that the thickness of the middle panel 320 illustrated by elements 320B and 320C is constrained to be at least as thick as the puzzle making material 140 for the puzzle to be housed inside the packaging sleeve assembly 300. This constraint is required because of the way in which the packaging sleeve assembly 300 holds the intact or assembled puzzle 200. Further, the lateral dimensions of the top, middle, and bottom panels 310, 320, 330 can also be any dimensions as desired to accommodate an intact or assembled puzzle 200 of any size as desired. The packaging sleeve assembly further comprises a pair of clamping strips 340 (see FIG. 15A) and an outer sleeve 350 (see FIG. 16A) that slides over the assembled panels 310, 320, and 330 as will be further described hereinbelow.

Figure 12:
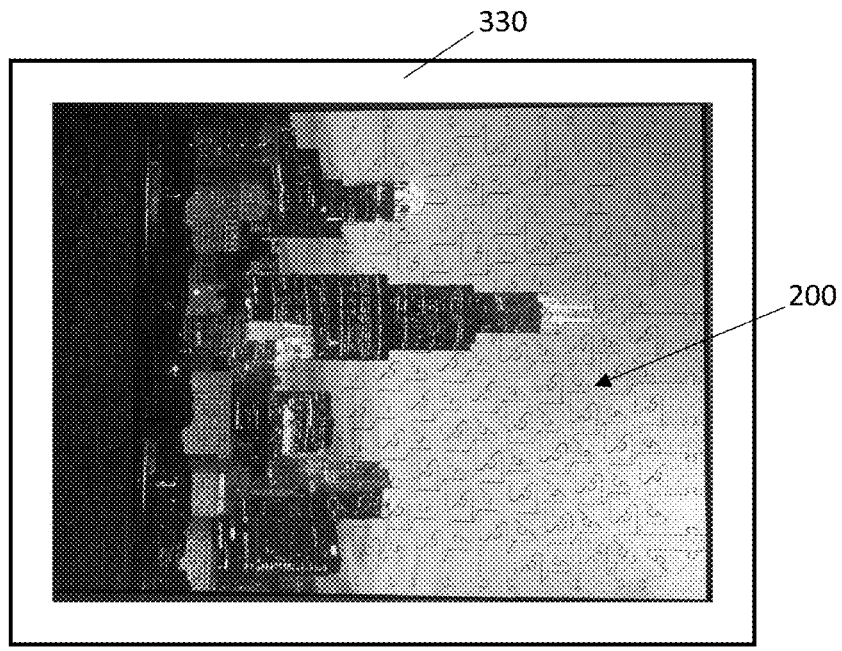
FIG. 12 illustrates a first exemplary step in packaging an intact puzzle within the packaging sleeve assembly.
Figure 13:
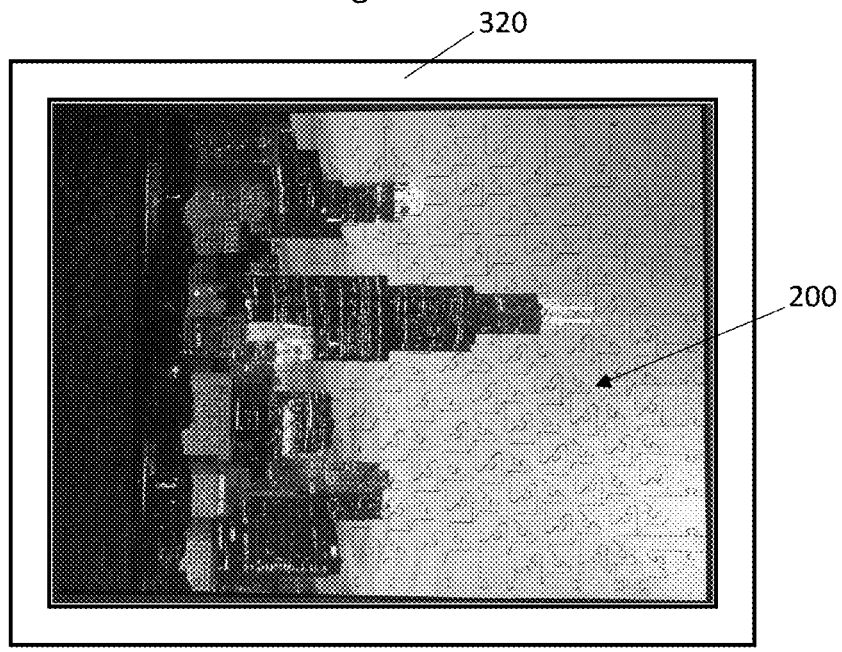
FIG. 13 illustrates a second exemplary step in packaging the intact puzzle within the packaging sleeve assembly.
Figure 14:
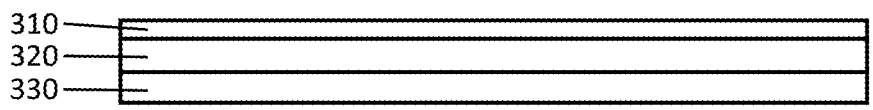
FIG. 14 illustrates an exemplary embodiment of a front view of top, middle, and bottom panels of the packaging sleeve assembly assembled.

Referring to FIG. 12, the intact or assembled puzzle 200 is placed on the bottom panel 330. Referring to FIG. 13, the middle panel 320 is positioned around the intact or assembled puzzle 200. It is to be noted that the middle panel 320 could be placed on the bottom panel 330 before the intact or assembled puzzle 200 is placed in the bottom panel—the order of placement doesn't matter. It is also to be noted that the middle panel 320 has a thickness at least as thick as the intact or assembled puzzle 200. FIG. 14 illustrates an exemplary embodiment of a front view of the top, middle, and bottom panels 310, 320, 330 assembled where the top panel 310 has been placed on top of the middle panel 320. In this configuration the intact or assembled puzzle 200 is now entirely contained within the three panels 310, 320, 330.

Figure 15A:
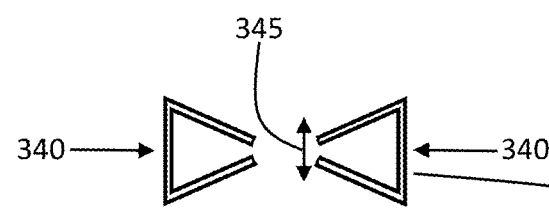
FIG. 15A is an edge-on view of exemplary clamping strips.
Figure 15B:
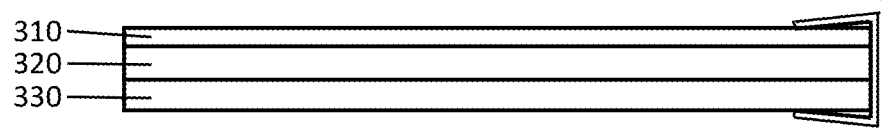
FIG. 15B is a front view of a clamping strip applied over an edge of the assembled top, middle, and bottom panels.
Figure 15C:
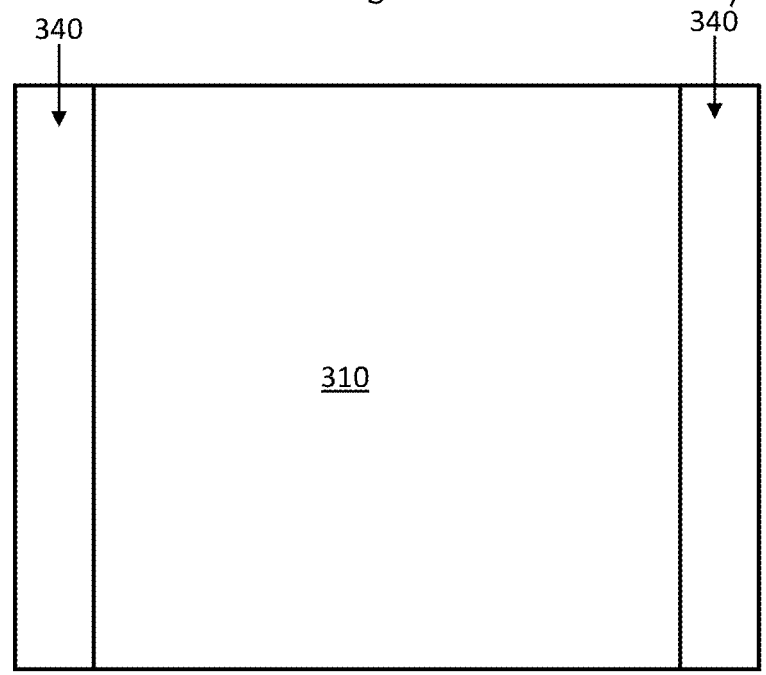
FIG. 15C is a top view of two clamping strips applied to opposite edges of the assembled top, middle, and bottom panels.

The pair of clamping strips 340 are illustrated edge on in FIG. 15A. The clamping strips 340 are made from a rigid material having elasticity, for example without limitation plastic, metal, or other material as may be known in the art that allows each clamping strip to flex in the direction of the double arrow 345 shown in FIG. 15A. Such flexibility allows the clamping strips 340 to open sufficiently to be slid over the edge of the three stacked panels 310, 320, 330 as illustrated in FIG. 15B. In use it is recommended that a clamping strip 340 is slid over two opposing edges of the assembled three panels 310, 320, 330 as shown in a top view in FIG. 15C. The final remaining component of the packaging sleeve assembly 300 is the outer sleeve 350.

Turning to FIG. 16A, the outer sleeve 350 is illustrated in three views including a top view 350A, a front view 350B, and a left side view 350C. As can be seen in the left side view 350C, in one embodiment the outer sleeve 350 is structured as a rectangular sleeve adapted to surround the assembled three panels 310, 320, 330. The outer sleeve 350 may or may not have the semicircular cutouts 355 visible in element 350A or the cutouts 355 may have another shape for example without limitation, triangular, rectangular, elliptical, pentagonal, hexagonal, or any regular or irregular closed polygonal shape as may be desired.

FIG. 16B illustrates a front view of the three assembled panels 310, 320, 330 having a clamping strip 340 attached over opposite left and right edges. The final step in the assembly of the packaging sleeve assembly 300 is illustrated in FIG. 16C. Sliding the outer sleeve 350 to the left as (indicated by line 370 in FIG. 16C) until the outer sleeve 350 entirely covers the assembled panels 310, 320, 330 completes the packaging sleeve assembly 300 by surrounding the assembled panels 310, 320, 330 on four sides with the outer sleeve 350. When fully assembled, portions of the top panel 310 and portions of the bottom panel 330 are exposed by the cutouts 355.

To remove the outer sleeve 350, in one embodiment a user may for example without limitation hold the outer sleeve 350 in one hand, grasp exposed portions of the top and bottom panels 310, 330 in the other hand, and slide the outer sleeve 350 relative to the assembled panels 310, 320, 330. Sliding the outer sleeve 350 to the right (as indicated by line 360 in FIG. 16C) removes the outer sleeve 350 from the assembled panels 310, 320, 330 as a first step to opening the packaging sleeve assembly 300. To further open the packaging sleeve assembly 300, the clamping strips 340 are removed and the top panel 310 is taken off of the middle panel 320.

The benefits of packaging the completed puzzle 200 intact within a packaging sleeve assembly 300 include not just improved durability and product stackability. Given the geometry of the packaging sleeve assembly 300 relative to the intact complete puzzle 200 packaged within, the packaging sleeve assembly 300 may also include a full sized image of the puzzle on its outer surfaces, for example on the outer sleeve 350.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

INDUSTRIAL APPLICABILITY

The process for making a puzzle includes the step of cutting puzzle pieces from a sheet of material and subsequently printing an image on the cut pieces. The resulting puzzle is far more durable than a conventional jigsaw puzzle and because of the process used to make it also benefits from the ability to replace individual pieces if lost. The puzzle is packaged intact in a packaging sleeve assembly designed to durably and aesthetically package the puzzle. The process for making a puzzle can be executed in industry and the packaging sleeve assembly can be manufactured in industry to produce puzzles made by the process and packaged within the packaging sleeve assembly for the enjoyment of consumers.

Numerous modifications to the present invention will be apparent to those skilled in the art in view of the foregoing description. It is not desired to limit the invention to the exact construction and operation shown and described, and accordingly, all suitable modifications and equivalents may be resorted to, falling within the scope of the invention. Accordingly, this description is to be construed as illustrative only of the principles of the invention and is presented for the purpose of enabling those skilled in the art to make and use the invention and to teach the best mode of carrying out same. The exclusive rights to all modifications which come within the scope of the appended claims are reserved. All patents, patent publications and applications, and other references cited herein are incorporated by reference herein in their entirety.

What is claimed is:

1. A process for making a puzzle, the process comprising:
    programming a plurality of puzzle shapes to be cut using a software interface of a cutting machine;
    distributing a plurality of thin strips of a strip supporting material across a supporting surface of the cutting machine;
    placing a sheet of puzzle making material on top of the plurality of the thin strips of the strip supporting material;
    cutting the sheet of puzzle making material into a plurality of individual puzzle pieces via the cutting machine;
    placing the cut sheet of puzzle making material on top of a slip sheet of paper on a printing deck of a printing machine;
    applying a clear coat of an adhesive primer to an upwardly facing first surface of the cut sheet of puzzle making material via the printing machine;
    applying a coat of white paint to the first surface of the cut sheet of puzzle making material via the printing machine; and applying at least one image onto the first surface of the cut sheet of puzzle making material via the printing machine.

2. The process for making a puzzle of claim 1, further comprising:
removing the cut and printed sheet of puzzle making material from the printing machine intact; and
packaging the cut and printed sheet of puzzle making material intact within a packaging sleeve.

3. The process for making a puzzle of claim 1, further comprising:
inverting the cut sheet of puzzle making material, such that a second surface opposite the first surface of the cut sheet of puzzle making material is upwardly facing;
placing the inverted cut sheet of puzzle making material on top of the slip sheet of paper on the printing deck of the printing machine;
applying a clear coat of an adhesive primer to the second surface of the cut sheet of puzzle making material via the printing machine;
applying a coat of white paint to the second surface of the cut sheet of puzzle making material via the printing machine; and
applying the at least one image onto the second surface of the cut sheet of puzzle making material via the printing machine.

4. The process for making a puzzle of claim 3, further comprising:
removing the cut and printed sheet of puzzle making material from the printing machine intact; and
packaging the cut and printed sheet of puzzle making material intact within a packaging sleeve.

5. The process for making a puzzle of claim 1, wherein the supporting surface of the cutting machine comprises a metallic material having a top surface and a plurality of holes oriented toward the top surface.

6. The process for making a puzzle of claim 1, wherein each of the plurality of thin strips of a strip supporting material have a supporting thickness in a range between about 0.01-0.25 inches.

7. The process for making a puzzle of claim 1, wherein the plurality of puzzle shapes to be cut are of the same shape.

8. The process for making a puzzle of claim 1, wherein the plurality of puzzle shapes to be cut comprise:
a plurality of boundary puzzle pieces located along a perimeter of the cut sheet of puzzle making material; and
a plurality of internal puzzle pieces located within the perimeter of the cut sheet of puzzle making material.

9. The process for making a puzzle of claim 8, wherein each of the plurality of internal puzzle pieces are of the same shape.

10. The process for making a puzzle of claim 8, wherein a shape formed by the perimeter of the cut sheet of puzzle making material is of the same shape of at least one of the internal puzzle pieces.

11. The process for making a puzzle of claim 1, wherein the sheet of puzzle making material is comprised of plastic or wood.

12. The process for making a puzzle of claim 11, wherein the sheet of puzzle making material has a thickness in a range between about 0.1-0.5 inches.

13. A puzzle made by the process of claim 1.

* * * * *